US007986964B2

(12) United States Patent
Jo et al.

(10) Patent No.: US 7,986,964 B2
(45) Date of Patent: Jul. 26, 2011

(54) SYSTEM AND METHOD FOR PROVIDING SMS2PSTN UNITED MESSAGING SERVICE USING SMS/MMS GATEWAY

(75) Inventors: San Ku Jo, Sungnam-si (KR); Hong Beom Jeon, Sungnam-si (KR); Joung Young Ha, Sungnam-si (KR); Yang Moon Yoon, Sungnam-si (KR); Hyun Chul Lee, Sungnam-si (KR); Jung Sook Lee, Sungnam-si (KR)

(73) Assignee: KT Corporation, Bundang-gu, Sungnam-si, Gyeonggi-do (KR)

( * ) Notice: Subject to any disclaimer, the term of this patent is extended or adjusted under 35 U.S.C. 154(b) by 393 days.

(21) Appl. No.: 12/297,369

(22) PCT Filed: Jun. 29, 2006

(86) PCT No.: PCT/KR2006/002544

§ 371 (c)(1),
(2), (4) Date: Jan. 29, 2009

(87) PCT Pub. No.: WO2007/119902

PCT Pub. Date: Oct. 25, 2007

(65) Prior Publication Data

US 2009/0131090 A1 May 21, 2009

(30) Foreign Application Priority Data

Apr. 18, 2006 (KR) ........................ 10-2006-0034859

(51) Int. Cl.
*H04M 1/00* (2006.01)

(52) U.S. Cl. .................. 455/550.1; 455/422.1; 455/466; 370/352; 379/220.01; 709/206

(58) Field of Classification Search ............... 455/550.1, 455/422.1, 466; 379/220.01; 370/352; 709/206
See application file for complete search history.

(56) References Cited

U.S. PATENT DOCUMENTS

| | | | | |
|---|---|---|---|---|
| 6,473,407 | B1 * | 10/2002 | Ditmer et al. | 370/252 |
| 7,818,713 | B2 * | 10/2010 | Hunter et al. | 717/100 |
| 2003/0027572 | A1 * | 2/2003 | Karlsson et al. | 455/433 |
| 2003/0123632 | A1 * | 7/2003 | Smith | 379/220.01 |
| 2004/0030752 | A1 * | 2/2004 | Selgas et al. | 709/206 |
| 2004/0192272 | A1 * | 9/2004 | Seo | 455/414.1 |
| 2006/0209791 | A1 * | 9/2006 | Khadri et al. | 370/352 |

FOREIGN PATENT DOCUMENTS

WO WO 2007/119902 10/2007

* cited by examiner

*Primary Examiner* — Danh C Le
(74) *Attorney, Agent, or Firm* — Lexyoume IP Group, PLLC.

(57) ABSTRACT

The present invention relates to a method and system for providing an SMS2PSTN united messaging service using an SMS/MMS gateway. The present invention includes an SMS2PSTN service providing server for providing at least one ID information among an e-mail ID, an IM ID, a personal mobile telephone number, a general telephone number information, or a Web address related to the called party telephone number; a database for storing membership registration information, charging information, SMS2PSTN service type, the e-mail ID, the IM ID, the personal mobile telephone number, the general telephone number information or the Web address; and a SMS/MMS gateway for querying with the called party telephone number extracted from the received SMS or MMS messages to the SMS2PSTN service providing server, and transmitting the converted result to the e-mail ID, the IM ID, the personal mobile telephone number, the general telephone number or the Web server.

15 Claims, 3 Drawing Sheets

Start
Register the membership registration information by being connected to the SMS2PSTN service providing server and set the SMS2PSTN service type
S11
Transmit the SMS message or the MMS message written from the mobile communication terminal or the telephone (Ann phone) capable of transmitting/receiving the SMS/MMS message to the MSG gateway
S12
Ann phone number?
S13
Yes
Transmit the SMS message or the MMS message to the Ann phone
S14
No
Query with the called party telephone number included in the received SMS or MMS message from the SMS/MMS gateway to the SMS2PSTN service providing server
S15
Receive the e-mail ID, the instant messenger (IM) ID, the personal mobile telephone number, the general telephone number or the Web address information related to the called party telephone number from the SMS2PSTN service providing server to the SMS/MMS gateway
S16
Transmit the data converted from the received SMS or MMS message by the SMS/MMS gateway to the e-mail ID, the instant messenger (IM) ID, the personal mobile telephone number, the general telephone number or the Web server set by the user related to the called party telephone number according to the predetermined SMS2PSTN service type
S17
Stop

SYSTEM AND METHOD FOR PROVIDING SMS2PSTN UNITED MESSAGING SERVICE USING SMS/MMS GATEWAY

TECHNICAL FIELD

The present invention relates to a system and a method for providing an SMS2PSTN united messaging service system; and, more particularly, to a method for providing an SMS2PSTN united messaging service system by using an SMS/MMS gateway to convert an SMS message or an MMS message from an SMS/MMS transmission client, a mobile communication terminal or a telephone (Ann phone) capable of transmitting/receiving a character message into an e-mail identification (ID), an instant messenger (IM), a personal portable terminal or a general telephone number (Text2Voice) to transmit the converted messages to a Web server related to a telephone number of a receiving side according to a predetermined service type of SMS2PSTN by the SMS/MMS gateway after subscribing the SMS2PSTN service.

BACKGROUND ART

Recently, a telephone (hereinafter, refers to as Ann phone) capable of transmitting/receiving character messages has been launched, and can be transmitted/received SMS messages transmitted to/from a mobile communication terminal or an SMS transmission client through an intelligent network (IN).

The Ann phone is capable of using various functions used at the mobile communication terminal such as a character message transmission/reception, a telephone number book function, caller identification (CID), 24 chord bell sounds, a large scaled LCD screen by using a home telephone. Also, the Ann phone provides a value added service such as a character message transmission/reception, the CID, a call forwarding service, a game, a bell sound download or the like. The Ann phone is expected to gain in public favor at home since the Ann phone can send the character message with the home telephone cheaper than the mobile communication terminal.

FIG. 1 shows a short message service (SMS) service construction diagram in a conventional mobile communication network.

As shown in FIG. 1, the SMS service system over the conventional mobile communication network includes a mobile communication terminal 20, an SMS transmission client 22, a telephone (Ann phone) 17 capable of transmitting/receiving the character messages, an SMS message center (SMC) having an SMS server capable of transmitting/receiving SMS messages, and a Mobile Internet Data Center (MIDC) 13 having an SMS gateway.

The mobile communication terminal 20 or the SMS transmission client 22 transmits the SMS messages written in an SMS editor to a called party telephone number (for example: Ann phone) of an opposite party through an SMC and the SMS gateway.

Although the conventional mobile communication terminal 20 can transmit the SMS messages to the Ann phone 17 through the intelligent network (IN) by the SMS server of the SMC and the SMS gateway, but a conventional telephone (PSTN telephone which does not have the Ann phone) cannot transmit the SMS messages.

Also, in case of receiving the SMS message including a called party telephone number transmitted from the SMS transmission client as a Web site for providing an SMS message transmission service or the mobile communication terminal 20, there are problems that an SMS message cannot be transmitted with an e-mail ID of a general telephone subscriber, an instant messenger (IM) ID and a personal mobile telephone number according to a predetermined service type, the voice data converted from the SMS message cannot be transmitted by converting the characters into the voice data by using the Text2Voice service to the general telephone number according to a pre-determined service type or the SMS message cannot be transmitted to the Web server set by a user.

DISCLOSURE OF INVENTION

Technical Problem

The present invention has been proposed in order to overcome the above-described problems in the background art. It is, therefore, an object of the present invention to provide a system and a method for supplying an SMS2PSTN united messaging service by using a short message service/multimedia message service (SMS/MMS) gateway, after a user subscribes a membership by connecting an SMS2PSTN service providing server through an SMS2PSTN client, if an SMS message or an MMS message can be transmitted at the SMS/MMS gateway with a called party telephone number from a mobile telecommunication terminal or an SMS/MMS transmission client or a telephone (Ann phone) capable of transmitting/receiving character messages, capable of converting messages received with an e-mail ID, an instant messenger (IM) ID or a mobile telephone number related to a called party general telephone number for transmitting the converted result, converting the characters into the voice data by using Text2Voice for transmitting the converted result to the general telephone number related to the called party general telephone number, or transmitting to a Web server set by a user in a form of a POST/GET or an XLM by using an http protocol according to a predetermined SMS2PSTN service type.

Technical Solution

In accordance with one aspect of the present invention, there is provided a system for providing an SMS2PSTN united messaging service by using a short message service/multi-media service (SMS/MMS) gateway, the system comprising: an SMS2PSTN service providing server, in case of transmitting an SMS message or an MMS message received from a mobile communication terminal, an SMS/MMS transmission client or a telephone (Ann phone) capable of transmitting/receiving an SMS/MMS message to a called party telephone number, if receiving a query with the called party telephone number included into the message (the SMS message or the MMS message) received from an SMS/MMS gateway, for providing at least one ID information among an e-mail ID, an instant messenger (IM) ID, a personal mobile telephone number, general telephone number information, or a Web address related to the called party telephone number; a database for storing membership registration information, charging information, SMS2PSTN service type, the e-mail ID, the IM ID, the personal mobile telephone number, the general telephone number information and the Web address related to the called party telephone number; and the SMS/MMS gateway, if an SMS message or an MMS message receives from a mobile communication terminal, an SMS/MMS transmission client, a telephone (Ann phone) capable of transmitting/receiving and character message toward the called party telephone number, for querying with the called party telephone number extracted from the received SMS or MMS messages to the SMS2PSTN service providing server, and performing any one of the steps of converting the received message into an e-mail header and a body data to transmit the converted e-mail header and the body data to the e-mail ID related to the called party telephone number through an e-mail server, converting the received message into an instant message to transmit the converted instant message to the IM ID through a messenger server, transmitting the received message to the personal mobile telephone number, converting characters into voice data by using a Text2Voice to a general telephone number to transmit the converted voice data, or transmitting the received message data to the Web server determined by a user in a type of POST/GET or XLM by using an http protocol according to a pre-determined SMS2PSTN service type.

Also, the system for supplying an SMS2PSTN united messaging service by using an SMS/MMS gateway according to the present invention further includes an SMS2PSTN service client for registering membership registration information to the SMS2PSTN service providing server through a Web site to provide the SMS2PSTN united messaging service from a general telephone subscriber (a general telephone subscriber which does not have an SMS/MMS message transmitting/receiving function).

In accordance with another aspect of the present invention, there is provided a method for providing an SMS2PSTN united messaging service using an SMS2PSTN service client, an SMS2PSTN service providing server and an SMS/MMS gateway, the method comprising the steps of: (a) registering membership registration information to the SMS2PSTN service providing server from the SMS2PSTN service client of a general telephone subscriber and setting an SMS2PSTN service type; (b) determining whether a called party telephone number included in an SMS message or an MMS message at an MSG gateway is a telephone number of a telephone (Ann phone) capable of transmitting/receiving a character message or not, if the SMS message or the MMS message written from a mobile communication terminal or an SMS/MMS transmission client or the telephone (Ann phone) capable of transmitting/receiving the character message to the MSG gateway through an SMS server or an MMS server so as to transmit the written SMS message or the MMS message to the called party telephone number; (c) transmitting the SMS message or the MMS message received by the MSG gateway to the telephone (Ann phone) capable of transmitting/receiving the character message if the called party telephone number is the Ann phone number according to the determined result; (d) if the called party telephone number is a general telephone number not the Ann phone number according to the determined result, transmitting the SMS message or the MMS message transmitted from the MSG gateway to the SMS/MMS gateway, if the called party telephone number included in the SMS message and the MMS message received by the SMS/MMS gateway is queried to the SMS2PSTN service providing server, receiving at least one ID information among an e-mail ID, an instant messenger (IM) ID, a personal mobile telephone number, a general telephone number or a Web address set by a user related to the called party general telephone number from the SMS2PSTN service providing server by the SMS/MMS gateway according to a predetermined SMS2PSTN service type; and (e) transmitting the message to any one ID of the e-mail ID, the IM ID or the personal mobile telephone number related to the called party telephone number included in the SMS message or the MMS message according to the predetermined the SMS2PSTN service type by the SMS/MMS gateway, converting characters into voice data by the Text2Voice to transmit the converted voice data to the general telephone number or transmitting the received message to a Web server set by a user in a form of POST/GET or XLM by using an http protocol.

In accordance with still another aspect of the present invention, there is provided a computer-readable storage medium having a program recorded thereon, where the program is to provide: a function for registering membership registration information with an SMS2PSTN service providing server of the computer, setting a charging information adding function and an SMS2PSTN service type and storing an e-mail ID, an instant messenger (IM) ID, a personal mobile telephone number, a general telephone number and a Web address set by a user related to a called party telephone number; a function, in case of transmitting an SMS message or an MMS message received from a mobile communication terminal, an SMS/MMS transmission client and a telephone (Ann phone) capable of transmitting/receiving a character message to a called party telephone number, if querying the called party telephone number included in the SMS message or the MMS message received from the SMS/MMS gateway, for providing at least one ID information among an e-mail ID, the instant messenger (IM) ID, the personal mobile telephone number, the general telephone number information, or the Web address set by the user related to the called party telephone number; a function for converting the received SMS message or the MMS message into an e-mail header and body data with the e-mail ID related to the called party telephone number and transmitting the SMS message or the MMS message received by the SMS/MMS gateway through an e-mail server; a function for converting the SMS message or the MMS message received by the SMS/MMS gateway to an instant messenger (IM) ID related to the called party telephone number and transmitting the converted instant message data to the IM ID through a messenger server; a function for transmitting the SMS message or the MMS message received by the SMS/MMS gateway to a personal mobile telephone number related to the called party telephone number; a function for converting the characters into the voice data by using the Text2Voice and transmitting the SMS message or the MMS message received by the SMS/MMS gateway to the general telephone number related to the called party telephone number; and a function for transmitting the SMS message or the MMS message received by the SMS/MMS gateway through a Web server set by a user related to the called party telephone number in a form of POST/GET or XLM by using an http protocol.

Advantageous Effects

As described above, when an SMS message or an MMS message is transmitted with a called party telephone number, a system and a method for providing an SMS2PSTN united messaging service by using an SMS/MMS gateway according to the present invention have effects that the message received by Text2Voice is converted with an e-mail ID, an instant messenger (IM) ID, a personal mobile telephone number or a general telephone related to the called party telephone number in accordance with a predetermined SMS2PSTN service type by querying the SMS2PSTN service providing server by extracting the called party telephone number included in the SMS message or the MMS message to the called party telephone number to transmit the converted results or transmits to a Web server set by a user.

The enterprise can provide the SMS/MMS automatic information (basic information, detailed link information, menu, brief map and event information) by receiving the SMS message or the MMS message to a conventional telephone number (representative telephone number or 080 number), process the opinions of the client synthetically, supply the callback service (Thanks you for sending the SMS to our company. I ll get back to you right away.) by the SMS/MMS gateway, provide the service personalized by using the caller ID by assigning the personalized additional numbers (0-9) to the conventional telephone number and provide the SMS or the MMS service to the call center number (080/1588) having the special telephone number to the customer. And also, a customer service can be improved by an automatic callback service by using new call identification (CID).

BRIEF DESCRIPTION OF THE DRAWINGS

These and other features, aspects, and advantages of preferred embodiments of the present invention will be more fully described in the following detailed description, taken accompanying drawings. In the drawings.

MODE FOR THE INVENTION

Hereinafter, preferred embodiments of the present invention will be described in detail with reference to the accompanying drawings. At first, terms or words used in the detailed description of the present invention and claims should not be interpreted as a conventional meaning or a dictionary meaning, but they are interpreted as meanings and concepts matching to a technical scope of the present invention based on a principle that the inventor can appropriately define concepts of terms to describe the invention of the inventor with the best mode.

Figure 1:
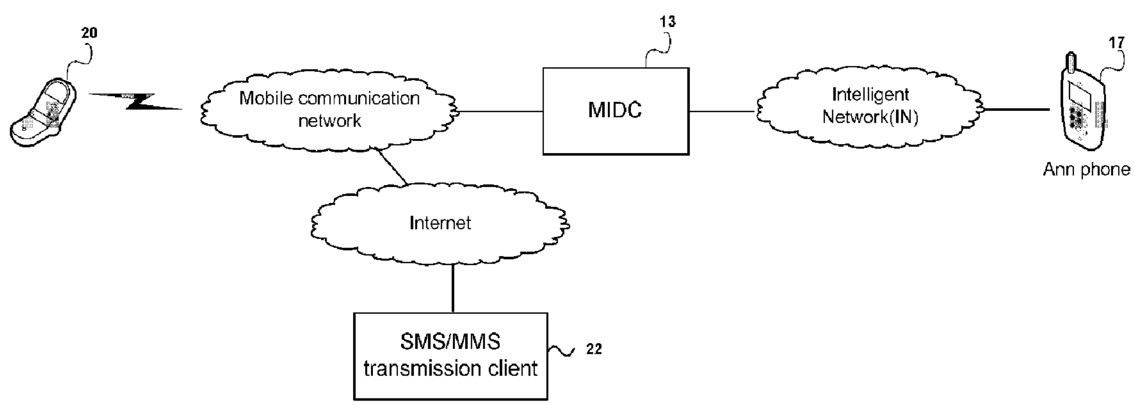
FIG. 1 shows a short message service (SMS) service construction diagram in a conventional mobile communication network.
Figure 2:
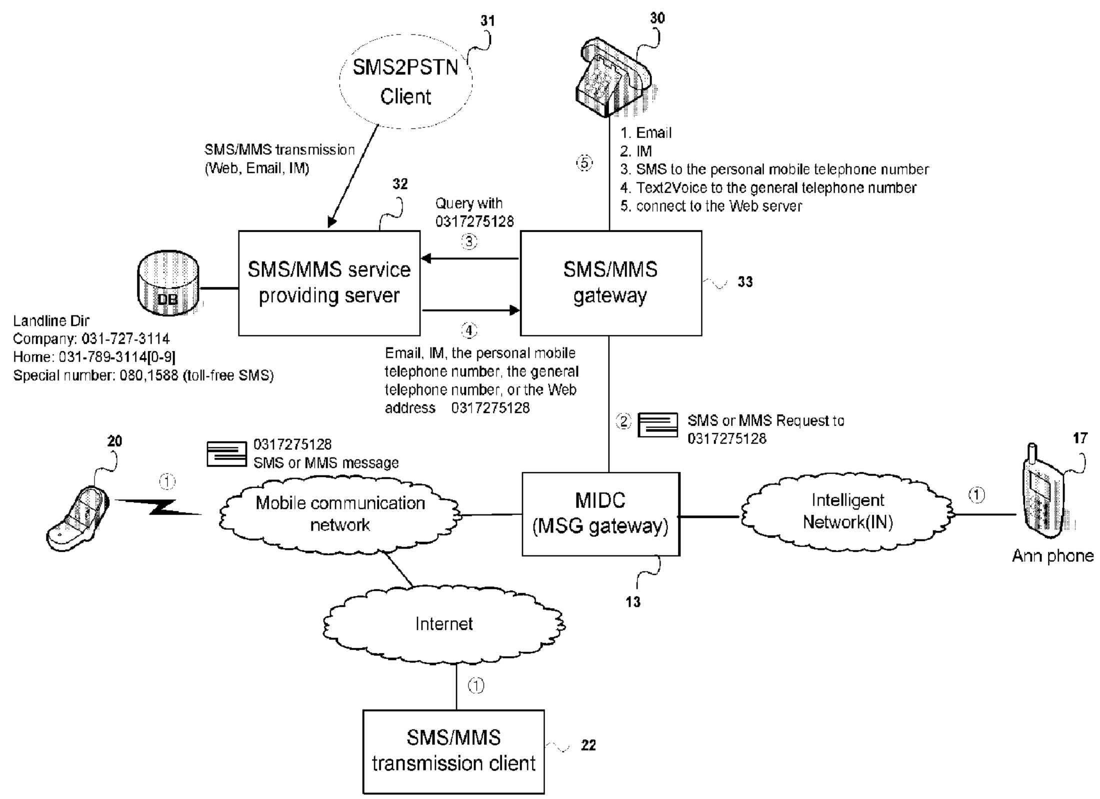
FIG. 2 is a construction diagram of a system for providing an SMS2PSTN united messaging service by using an SMS/MMS gateway according to the present invention.

FIG. 2 is a construction diagram of a system for providing an SMS2PSTN united messaging service by using an SMS/MMS gateway according to the present invention.

As shown in FIG. 2, the system for providing an SMS2PSTN united messaging service by using an SMS/MMS gateway according to the present invention includes an MSG gateway 13 of the MIDC, an SMS2PSTN service client 31, an SMS2PSTN service providing server 32 and an SMS/MMS gateway 33.

The SMS2PSTN service client 31 registers membership registration information by being connected to the SMS2PSTN service providing server 32 and provides a function of setting an SMS2PSTN service type as a Website to supply the SMS2PSTN united messaging service from a general telephone subscriber (PSTN subscriber who does not have Ann phone).

The database of the SMS2PSTN service providing server 32 stores the membership registration information, charging information, an SMS2PSTN service type, e-mail ID related to an SMS2PSTN service type and a called party telephone number, an instant messenger (IM) ID, a personal mobile telephone number, a general telephone number and a Web address set by a user.

The SMS2PSTN service type previously sets whether at least information among an e-mail ID, an instant messenger ID, a personal mobile telephone number, a general telephone number or Web address information set by the user related to a called party telephone number of the user is capable of being received or not when an SMS message or an MMS message is received.

The membership registration information includes an ID for authenticating the user inputted from the SMS2PSTN service client 31, a password, a name, an identification number, an address, an SMS2PSTN messaging service type, an e-mail ID, an instant messenger (IM) type and an instant messenger ID, a personal mobile telephone number, a home telephone number, an office telephone number and a Web address set by the user and stores them to the SMS2PSTN service providing server 32.

The information related to the called party telephone number (PSTN general telephone number which is not Ann phone) includes an e-mail ID, the instant messenger (IM) ID, the personal mobile telephone number, the general telephone number information and the Web address information set by the user and stores them to the SMS2PSTN service providing server 32.

The SMS2PSTN service providing server 32 supplies at least one ID information among the e-mail ID, the instant message (IM) ID, the personal mobile telephone number and the general telephone number information to the SMS/MMS gateway 33 according to the predetermined SMS2PSTN service type if being queried from the SMS/MMS gateway 33 by the called party telephone included in the received SMS message or the MMS message.

The SMS2PSTN service providing server 32 stores a called/calling SMS message and is capable of managing and identifying the SMS message.

The MSG gateway 13 of the MIDC determines whether the called party telephone number included in the received SMS message or the received MMS message is a telephone number of a telephone (Ann phone) 17 capable of transmitting/receiving the character message or not by receiving the SMS message or the MMS message transmitted from a mobile telephone terminal 20, an SMS/MMS transmission client 22 or the telephone (Ann phone) 17 capable of transmitting/receiving the character message through an SMS server or an MMS server.

The MSG gateway 13 of the MIDC transmits the received SMS message or the received MMS message to any one of the telephone (Ann phone) 17 capable of transmitting/receiving the character message and the SMS/MMS gateway 33 or transmits the received SMS message or the received MMS message to both the telephone 17 and the SMS/MMS gateway 33, simultaneously.

If the SMS/MMS gateway 33 receives the SMS message or the MMS message from the mobile communication terminal 20, the SMS transmission client 22 and the telephone (Ann phone) 17 capable of transmitting/receiving the character message, it queries with the called party telephone number extracted from the received SMS message or the received MMS message to the SMS2PSTN service providing server 32 and converts the received SMS message or the received MMS message into a header message and a body message of the e-mail according to the predetermined SMS2PSTN service type to transmit the converted header message and the body message to the e-mail ID related to the called party general telephone number through an e-mail server, converts the received SMS message or the received MMS message into the instant messenger data to transmit the converted instant messenger data to the instant message (IM) ID related to the called party telephone number through a messenger server, transmits the SMS message or the MMS message to the personal mobile telephone number related to the called party telephone number or converts characters into voice data by a Text2Voice function (TTS (Text-To-Sound) function to convert the character into the voice by using a character recognition software) to transmit the converted voice data to the general telephone number related to the called party telephone number.

The SMS/MMS gateway 33 includes a module for searching at least one ID information among the e-mail ID, the IM ID, the personal mobile telephone number, the general telephone number or the Web address set by the user related to the called party telephone number according to the predetermined SMS2PSTN service type by querying with the called party telephone number extracted from the SMS message or the MMS message received from the mobile communication terminal 20 or the SMS/MMS transmission client 22 or the telephone (Ann phone) 17 capable of transmitting/receiving the character message or the character message to the SMS2PSTN service providing server 32, a module (SMS2Email) for classifying the received SMS message into the e-mail header and the body and for converting into the e-mail data to transmit the converted e-mail data to the e-mail ID related to the called party telephone number through the e-mail server; a module (SMS2IM) for converting the received SMS message into instant message data to transmit the converted instant message data to the IM ID related to the called party telephone number through the messenger server; a module (SMS2Mobile) for transmitting the received SMS message to a personal mobile telephone number related to the called party telephone number; a module (Text2Voice) for transmitting the converted voice data by converting the characters into the voice by using a Text2Voice function (TTS function) to the general telephone number related to the called party telephone number; and a module (SMS2Web) for transmitting the received SMS message in a form of POST/GET or XLM by using an http protocol to the Web server set by a user related to the called party telephone number.

The SMS/MMS gateway 33 includes a module for searching at least one ID information among the e-mail ID, the IM ID, the personal mobile telephone number, the general telephone number or the Web address set by the user related to the called party telephone number according to the predetermined SMS2PSTN service type by querying the called party telephone number extracted from the MMS message received from the mobile communication terminal 20 or the SMS/MMS transmission client 22 or the telephone (Ann phone) 17 capable of transmitting/receiving the character message to the SMS2PSTN service providing server 32, a module (MMS2Email) for classifying the MMS header and the MMS body from the received MMS message into the e-mail header and the body and for converting the e-mail header and the body into the e-mail data to transmit the converted e-mail data to the e-mail ID related to the called party telephone number through the e-mail server, a module (MMS2IM) for converting the received MMS message into instant message data and transmitting the converted instant message data to the IM ID related to the called party telephone number through the messenger server, a module (MMS2Mobile) for transmitting the received MMS message to a personal mobile telephone number related to the called party telephone number, a module (Text2Voice) for receiving the MMS message data and transmitting the converted voice data by converting the characters into the voice by using a Text2Voice function (TTS function) to the general telephone number related to the called party telephone number, and a module (MMS2Web) for transmitting the received MMS message in a form of POST/GET or XLM by using an http protocol to the Web server set by a user related to the called side telephone number.

The called party general telephone number, when the SMS message or the MMS message is transmitted to a conventional telephone number of an enterprise (representative telephone number and 080 telephone number), transmits the SMS/MMS message without exposing a personal mobile telephone number and provides an automatic callback function by using a call identification (CID) of the originator to the CID server.

The called party general telephone number is capable of receiving the SMS/MMS message by setting a plurality of additional numbers (0-9) added to a conventional general telephone number by personalizing the called party telephone number of the home or the enterprise (Caller ID)(for example, 0: farther, 1: mother, 2: first son, 3: second son).

The SMS/MMS gateway 33 integrally manages the SMS message or the MMS message and originator information received through the Internet by an additional pre-determined management client, automatically transmits the SMS/MMS reply message through the Internet, and manages the transmission messages.

The SMS/MMS gateway 33 provides the SMS/MMS automatic information (basic information, detailed information link, menu, an outline map and an event information) as 24 hours reception message through the representative telephone number, the call center telephone number and a special telephone number (1588) and provides the callback service having a predetermined sentence to an originator side telephone number included in the received SMS message or the MMS message.

The SMS2PSTN service providing server 32 stores the personalized information of the called party telephone numbers of the home and the enterprise into the database so as to supply the personalized service by applying the additional number (Caller ID) to the caller party telephone number by the SMS/MMS gateway 33.

The SMS/MMS gateway 33 is capable of transmitting the SMS message or the MMS message by setting a plurality of additional numbers (0-9) added to the conventional general telephone number by personalizing the called party telephone numbers of the home or the enterprise.

Figure 3:
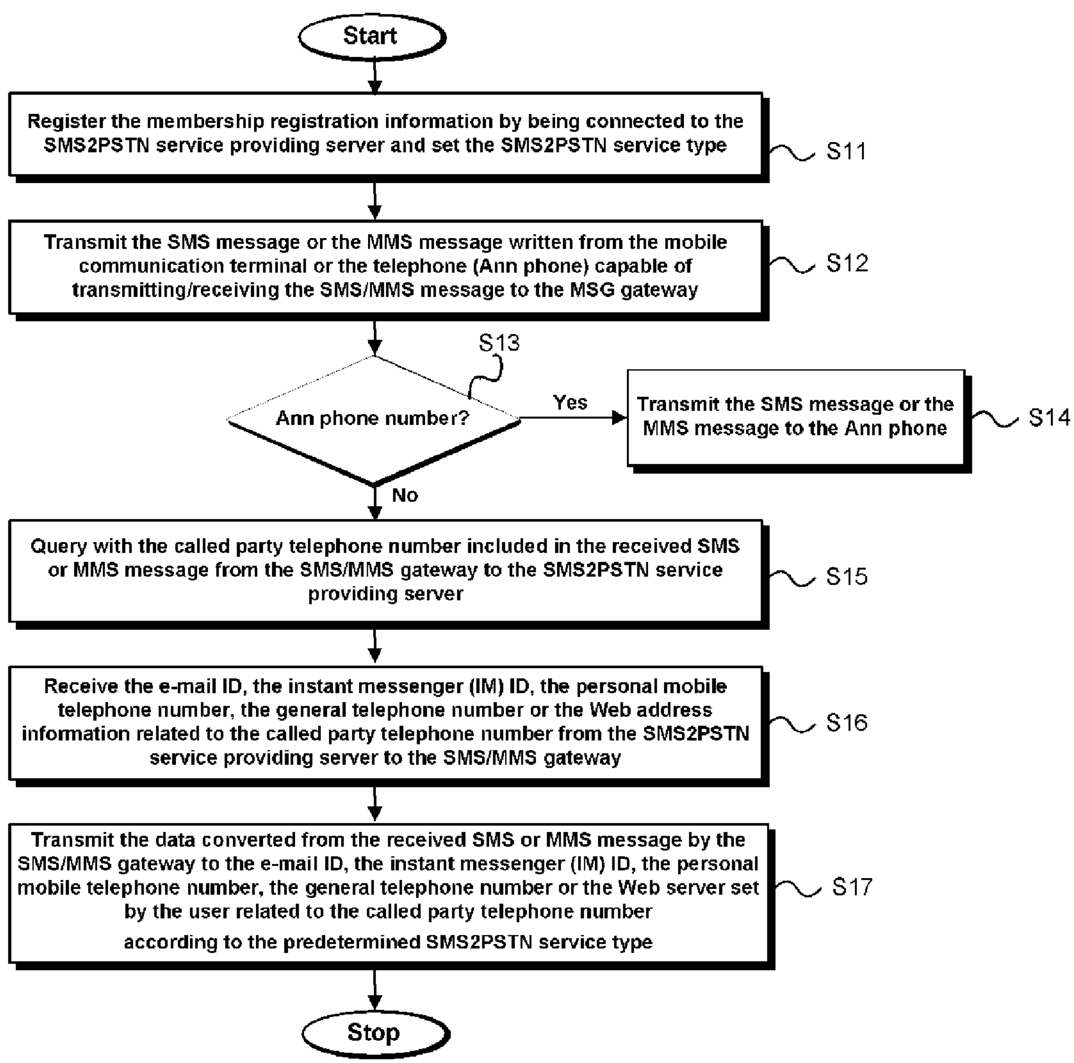
FIG. 3 represents a flow chart showing a method for providing an SMS2PSTN united messaging service by using an SMS/MMS gateway according to the present invention.

FIG. 3 represents a flow chart showing a method for providing an SMS2PSTN united messaging service by using an SMS/MMS gateway according to the present invention.

The general telephone subscriber (PSTN subscriber who does not have the Ann phone) registers the membership registration information by being connected to the SMS2PSTN service providing server 32 through the SMS2PSTN service client 31 and sets the SMS2PSTN service type (step S11).

If the SMS message or the MMS message written from the mobile communication terminal 20 or the SMS/MMS transmission client 22 or the telephone (the Ann phone) 17 capable of transmitting/receiving the character message is transmitted to the MSG gateway 13 of the mobile internet data center (MIDC) through the SMS server and the MMS server (step S12), the MSG gateway 13 of the MIDC determines whether the called party telephone number included in the received SMS message or the received MMS message is the telephone number of the telephone (the Ann phone) 17 capable of transmitting/receiving the character message (SMS/MMS message) or not (step S13).

The MSG gateway 13 of the MIDC is capable of transmitting the received SMS message or the received MMS message to any one of the telephone (the Ann phone) 17 capable of transmitting/receiving the character message and the SMS/MMS gateway 33 as well as is capable of transmitting the received SMS message or the MMS message to both the telephone (Ann phone) 17 and the SMS/MMS gateway 33.

If the called party telephone number is the Ann phone telephone number according to the determination result at the step S13, the MSG gateway 13 of the MIDC transmits the SMS message or the MMS message to the telephone (Ann phone) 17 capable of transmitting/receiving the character message through an intelligent network (IN) (step S14).

If the called party telephone number is a general telephone number, which is not the Ann phone telephone number according to the determination result at the step S13, the MSG gateway 13 of the MIDC transmits the SMS message or the MMS message to the SMS/MMS gateway 33.

If the SMS/MMS gateway 33 receives the SMS message or the MMS message transmitted to the called party telephone number, it queries with the called party telephone number to the SMS2PSTN service providing server 32 by extracting the called party telephone number included in the received SMS message or the MMS message (step S15).

The SMS/MMS gateway 33 receives at least one information among the e-mail ID, the instant messenger (IM) ID, the personal mobile telephone number, the general telephone number or the Web address set by the user related to the called party telephone number from the SMS2PSTN service providing server 32 according to the predetermined SMS2PSTN service type (step S16).

The SMS/MMS gateway 33 extracts the called party telephone number included into the received SMS message or the received MMS message according to the pre-determined SMS2PSTN service type, converts the received SMS message or the received MMS message into the e-mail header and the body data to transmit the converted e-mail header and the body data to the e-mail ID related to the called party telephone number through the e-mail server, converts the received SMS message or the received MMS message into the instant message data to transmit the converted instant message data to the instant messenger (IM) ID related to the called party telephone number through the messenger server, transmits the received SMS message or the received MMS message to the personal mobile telephone number, converts the short message/multimedia message characters into the voice data through the Text2Voice service and transmits the converted voice data to the general telephone number, or transmits the received SMS message or the received MMS message in a form of POST/GET or XLM to the Web server set by the user by using http protocol (step S17).

The SMS2PSTN united messaging service by using an SMS/MMS gateway 33 provides a basic service, an enterprise service and a home service as one embodiment.

(1) Basic Service

The basic service supplies a service for converting the SMS/MMS message into data with the e-mail ID, the instant messenger (IM) ID, the voice synthesis (Text2Voice) or the personal mobile telephone number related to the called party telephone number, respectively, to forward the converted data.

The SMS/MMS gateway 33 is connected to a predetermined management client to integrally manage the SMS message or the MMS message and the originator message totally received through the Internet, supplies the SMS/MMS reply message automatic transmission function through the Internet and manages the transmission message.

(2) Enterprise Service

The enterprise service supplies the SMS/MMS automatic information (conventional information, detailed information link, menu, brief map and event information) as the received message during 24 hours.

The SMS/MMS gateway 33 provides the callback service ("Thanks you for sending the SMS to our company. I'll get back to you right away."), provides a personalized service by using the caller ID and supplies a tall free SMS service with a call center number (080/1588) having a special telephone number to a client.

(3) Home Service

The home service is capable of providing a messaging service by assigning persons to one digit additional numbers (0-9) (Caller ID) added to the conventional telephone number by personalizing the home telephone number (for example: 0; farther, 1; mother, 2; first son, 3; second son).

(For example) Home telephone number: 031-789-3114[0-9]

The SMS2PSTN united messaging service by using an SMS/MMS gateway 33 provides a wireless business development base, reconsiders a value of personalization of the home telephone number, activates a telephone (the Ann phone) business having a function of transmitting/receiving the character message and reconsiders a mobility of a gradual number.

Therefore, after a membership is subscribed by connecting to the SMS2PSTN service providing server 32 through the SMS2PSTN client 31 to provide the SMS2PSTN united messaging service, if the SMS/MMS gateway 33 receives the SMS message or the MMS message transmitted from the SMS/MMS transmission client 22, the mobile communication terminal 20 or the telephone (the Ann phone) 17 having a function capable of transmitting/receiving the character message to the called party telephone number (the PSTN subscriber telephone number which does not have the Ann phone), the SMS/MMS gateway 33 provides the PSTN united messaging service to convert the received messages into the e-mail ID, the instant messenger (IM) ID or the personal mobile telephone number related to the called party general telephone number according to the predetermined SMS2PSTN service type for transmitting the converted results, to convert the characters into the voice data by using the Text2Voice for transmitting the converted voice data to the general telephone number, or transmits the received message in a form of POST/GET or XLM to the Web server set by user by using the http protocol.

The enterprise can provide the SMS/MMS automatic information (basic information, detailed information link, menu, brief map and event information) by receiving the SMS message or the MMS message to a conventional telephone number (representative telephone number or 080 number), process the opinions of the client synthetically, provide the callback service (Thanks you for sending the SMS message to our company. I ll get back to you right away.) by the SMS/MMS gateway 33, provide the service personalized by using the caller ID by assigning the personalized additional numbers (0-9) added to the conventional number, and provide the SMS or the MMS service to the call center number (080/1588) having the special telephone number to the customer.

While the present invention has been described with respect to certain preferred embodiments, it will be apparent to those skilled in the art that various changes and modifications may be made without departing from the scope of the invention as defined in the following claims.

The invention claimed is:

1. A system for providing a united messaging service, the system comprising:

a database for storing membership data including membership registration information, a service type, and identification (ID) information for each member;

a server for receiving the membership data from the database and providing the membership data; and a SMS/MMS gateway for receiving a short message service (SMS) message or a multi-media service (MMS) message transmitted from a SMS/MMS transmitting terminal to a called party, extracting a called party telephone number from the received message, querying with the called party telephone number to the server to receive the ID information and the service type related to the called party telephone number, and converting the message in a format determined by service type.

2. The system of claim 1, further comprising:

a message gateway for determining whether a terminal associated with the called party telephone number is capable of receiving the SMS message or the MMS message, wherein the message gateway forwards the SMS message or the MMS message to the SMS/MMS gateway in case that the terminal associated with the called party telephone number is not capable of receiving the SMS message or the MMS message.

3. The system of claim 1, wherein the SMS/MMS gateway includes:

a querying module for querying the ID information and the service type related to the called party telephone number with the called party telephone number to the server; and an e-mail transmitting module for, if the ID information related to the called party telephone number is an e-mail ID, converting the received message into e-mail data to transmit the converted e-mail data to the e-mail ID.

4. The system of claim 1, wherein the SMS/MMS gateway includes:

a querying module for querying the ID information and the service type related to the called party telephone number with the called party telephone number to the server; and an instant messaging module for, if the ID information related to the called party telephone number is an instant messaging ID, converting the received message into instant message data to transmit the converted instant message data to the instant messaging ID.

5. The system of claim 1, wherein the SMS/MMS gateway includes:

a querying module for querying the ID information and the service type related to the called party telephone number with the called party telephone number to the server; and a messaging module for, if the ID information related to the called party telephone number is a personal mobile telephone number, transmitting the received message to the personal mobile telephone number.

6. The system of claim 1, wherein the SMS/MMS gateway includes:

a querying module for querying the ID information and the service type related to the called party telephone number with the called party telephone number to the server; and a text-to-speech module for, if the ID information related to the called party telephone number is a PSTN telephone number, converting the received message into voice data to transmit the converted voice data to the PSTN telephone number.

7. The system of claim 1, wherein the SMS/MMS gateway includes:

a querying module for querying the ID information and the service type related to the called party telephone number with the called party telephone number to the server; and a module for, if the receiving ID information related to the called party telephone number is an URL, transmitting the received message to the URL.

8. The system of claim 1, wherein the SMS/MMS gateway provides a reply service of a predetermined sentence to a calling party of the received message.

9. A method for providing a united messaging service when a terminal capable of transmitting short message service (SMS) messages or multi-media service (MMS) messages (hereafter, referred to as 'SMS/MMS transmitting terminal') transmits an SMS message or an MMS message to a called party, the method comprising:

determining whether a terminal associated with a called party telephone number included in the SMS message or the MMS message is capable of receiving the SMS message or the MMS message;

transmitting the SMS message or the MMS message to the called party telephone number if the terminal associated with the called party telephone number is capable of receiving the SMS message or the MMS message;

querying ID information and a service type related to the called telephone number if the terminal associated with the called party telephone number is not capable of receiving the SMS message or the MMS message;

converting the SMS message or the MMS message in a format determined by service type; and transmitting the converted message according to the ID information.

10. The method of claim 9, wherein the converting of the SMS message or the MMS message further comprises:

converting the received SMS message or MMS message into e-mail data, and wherein the transmitting the converted message further comprises:

transmitting the converted e-mail data to an e-mail ID related to the called party telephone number.

11. The method of claim 9, wherein the converting of the SMS message or the MMS message further comprise:

converting the received SMS message or MMS message into instant message data, and wherein the transmitting the converted message further comprises:

transmitting the converted instant message data to the instant messaging ID related to the called party telephone number.

12. The method of claim 9, wherein the transmitting the converted message further comprises:

transmitting the received SMS message or MMS message to a personal mobile telephone number related to the called party telephone number.

13. The method of claim 9, wherein the converting of the SMS message or the MMS message further comprise:

converting the received SMS message or MMS message into voice data, and wherein the transmitting the converted message further comprises:

transmitting the converted voice data to an PSTN telephone number related to the called party telephone number.

14. The method of claim 9, wherein the transmitting the converted message further comprises:

transmitting the received SMS message or the MMS message to an URL.

15. The method of claim 9, further comprising:

sending a predetermined sentence as a reply message to a calling party telephone number of the received SMS or MMS message.

* * * * *